United States Patent
Stack

(10) Patent No.: US 7,421,349 B1
(45) Date of Patent: Sep. 2, 2008

(54) BEARING FAULT SIGNATURE DETECTION

(75) Inventor: Jason Stack, Panama City Beach, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/449,185

(22) Filed: May 15, 2006

(51) Int. Cl.
*G06F 19/00* (2006.01)
*G06F 17/30* (2006.01)

(52) U.S. Cl. .............................. 702/35; 73/570; 73/660; 340/500; 340/540; 340/679; 340/680; 340/683; 702/33; 702/34; 702/56; 702/187; 702/188; 702/189

(58) Field of Classification Search ................... 73/570, 73/660; 340/500, 540, 679, 680, 683; 700/283; 702/33, 34, 35, 56, 1, 127, 187, 188, 189
See application file for complete search history.

(56) References Cited

U.S. PATENT DOCUMENTS

| | | | | | |
|---|---|---|---|---|---|
| 2,799,015 | A | * | 7/1957 | Bell | 340/683 |
| 3,242,321 | A | * | 3/1966 | Chope | 702/185 |
| 4,320,662 | A | * | 3/1982 | Schaub et al. | 73/660 |
| 4,559,828 | A | * | 12/1985 | Liszka | 73/658 |
| 5,566,092 | A | * | 10/1996 | Wang et al. | 702/185 |
| 6,053,047 | A | * | 4/2000 | Dister et al. | 73/593 |

FOREIGN PATENT DOCUMENTS

JP          55-138616 A    * 10/1980

* cited by examiner

*Primary Examiner*—Edward R Cosimano
(74) *Attorney, Agent, or Firm*—James T. Shepherd

(57) ABSTRACT

A device, and method, detects the presence of developing faults in rolling element bearings. Detection is accomplished by measuring the vibration of the apparatus in which the bearing is operating (motor, generator, engine, etc.) and searching for signatures unique to bearing faults. These signatures are predicted by a fault signature model and recognized by a detector, both of which are part of this invention.

18 Claims, 4 Drawing Sheets

---

METHOD FOR MONITORING THE PRESENCE OF FAULTS DEVELOPING IN ROLLING ELEMENT BEARING

Detecting the presence of developing faults by:

(i) determining a given set of characteristic fault frequencies proportional to rolling element bearing functionality;

(ii) measuring vibration of an apparatus in operation containing rolling element bearings;

(iii) incorporating the characteristic fault frequencies and measured vibration into a fault signature model;

(iv) applying a detector to detect and indicate the presence of developing faults in rolling element bearings within the apparatus

↓

Indicating the presence of a developing fault

Figure 2(a)
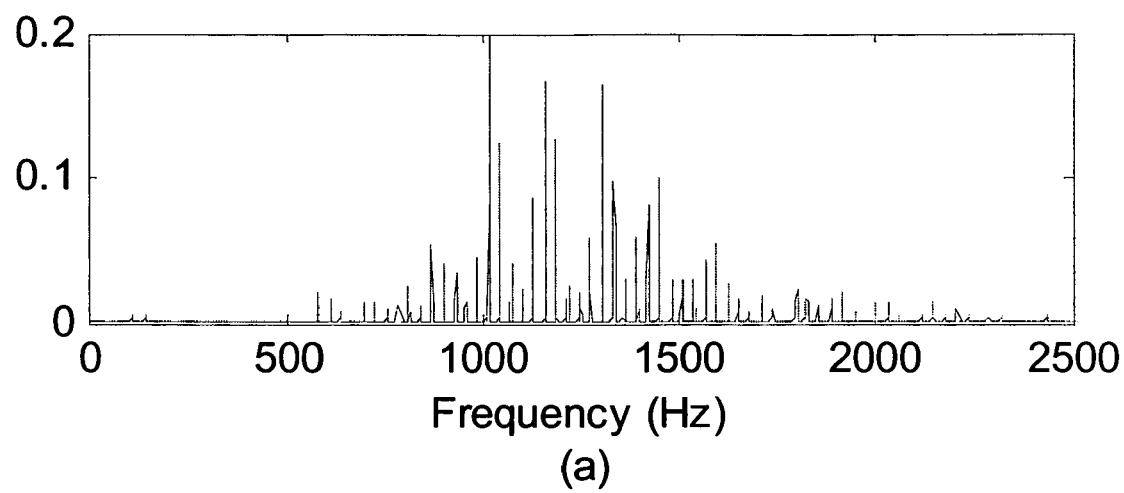
(a)
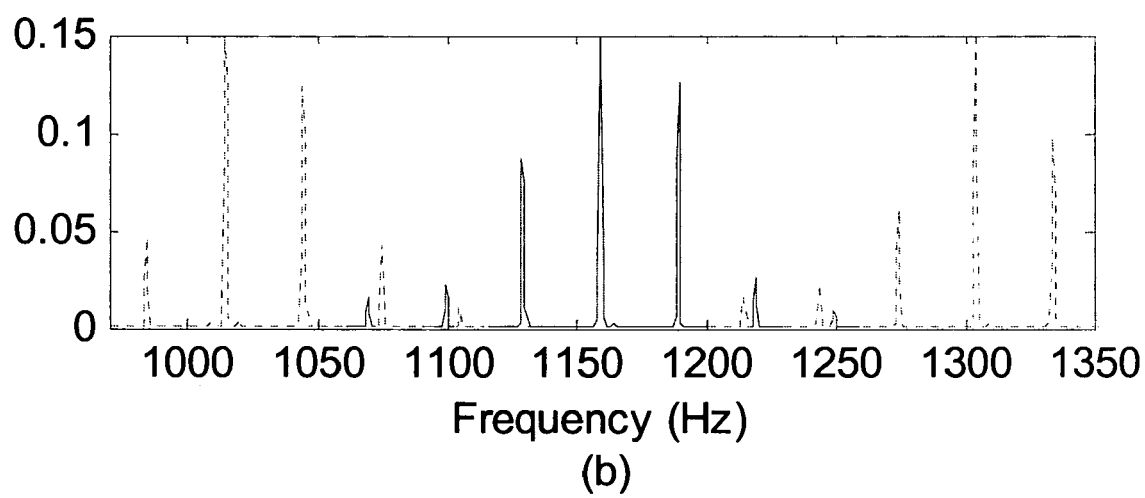
(b)
Figure 2(b)

METHOD FOR MONITORING THE PRESENCE OF FAULTS DEVELOPING IN ROLLING ELEMENT BEARING

Detecting the presence of developing faults by:

(i) determining a given set of characteristic fault frequencies proportional to rolling element bearing functionality;

(ii) measuring vibration of an apparatus in operation containing rolling element bearings;

(iii) incorporating the characteristic fault frequencies and measured vibration into a fault signature model;

(iv) applying a detector to detect and indicate the presence of developing faults in rolling element bearings within the apparatus

↓

Indicating the presence of a developing fault

FIG. 4

BEARING FAULT SIGNATURE DETECTION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

BACKGROUND OF THE INVENTION

1. Field of the Invention

The present invention relates to detecting the presence of developing faults in rolling element bearings by measuring the vibration of an apparatus in which bearings are operating and identifying signatures unique to bearing faults. These signatures are predicted by a fault signature model and recognized by a detector.

2. Brief Description of the Related Art

There is an abundance of techniques in the literature designed to detect the characteristic fault frequencies produced by faults in rolling element bearings. A bearing fault will produce one of the four characteristic fault frequencies depending on which bearing surface contains the fault. The characteristic fault frequencies can be calculated using equations (1)-(4), shown below, as described in T. A. Harris, Rolling Bearing Analysis 4$^{th}$ ed., New York: John Wiley and Sons Inc., 2001. pp. 307-311.

$$F_{CF} = \frac{1}{2} F_R \left(1 - \frac{D_B \cos(\theta)}{D_P}\right) \quad (1)$$

$$F_{ORF} = \frac{N_B}{2} F_R \left(1 - \frac{D_B \cos(\theta)}{D_P}\right) \quad (2)$$

$$F_{IRF} = \frac{N_B}{2} F_R \left(1 + \frac{D_B \cos(\theta)}{D_P}\right) \quad (3)$$

$$F_{BF} = \frac{D_P}{2 D_B} F_R \left(1 - \frac{D_B^2 \cos^2(\theta)}{D_P^2}\right) \quad (4)$$

These frequencies are illustrated in FIG. 1 where:

$F_R$=rotor (shaft) frequency
$F_{CF}$=cage fault frequency
$F_{IRF}$=inner raceway fault frequency
$F_{ORF}$=outer raceway fault frequency
$F_{BF}$=ball fault frequency
$D_B$=ball diameter
$D_P$=pitch diameter
$N_B$=number of rolling elements
$F_{RE}$=direction of force exerted by the rolling element on the outer raceway
$\theta$=ball contact angle.

This invention claims that simply searching for the characteristic fault frequencies (either in the baseband vibration or through a high frequency resonance/envelope analysis technique) is often insufficient for the following two reasons. First, the frequency response of the apparatus being monitored will change continuously as a function of changes in load torque, coupled loads, mounting tightness, etc. A common consequence of this is to damp vibrations at the lower frequency ranges where the characteristic fault frequencies are predicted to appear. Therefore, even though these characteristic fault frequencies are produced inside a bearing with a developing fault, this energy is attenuated as it propagates through the apparatus toward the sensor and is thus undetectable.

Second, the vibration spectrum of any sufficiently complex (and actively excited) mechanical system is extremely rich with peaks. These peaks originate from a wide variety of sources including natural mechanical resonance, active sources from other mechanically and acoustically coupled systems, measurement noise, etc. Therefore, when searching for energy at a particular frequency or peaks at a given frequency spacing, it is common to find some amount of energy at these locations regardless of what the location is. However, it is impossible to know if these peaks are generated by the desired process (e.g., a bearing fault) or if they are from multiple unrelated processes and their location in the frequency spectrum is only coincidental. This invention describes a technique that successfully detects developing bearing faults while accounting for both of these phenomena.

As such, there is a need in the art to provide improved comprehensive detection of developing roller element bearing faults for operational machinery. The present invention addresses this and other needs.

SUMMARY OF THE INVENTION

The present invention includes a device for detecting the presence of faults developing in rolling element bearings within an apparatus having a means for measuring vibration of an apparatus in operation, a detector for recognizing the signature of rolling element bearing faults within the measured vibration, a fault signature model based on the recognized signature of rolling element bearing faults and a comparator effective for comparing sampled vibrational noise of the apparatus in operation with the fault signature mode.

The present invention also includes a method for detecting the presence of faults developing in rolling element bearings having the steps of operating an apparatus containing rolling element bearings, measuring vibration of the operating apparatus, developing a standard noise pattern for the measured vibration, sampling additional vibrational measurements of the operating apparatus and comparing the sampled vibrational measurements to the standard noise pattern effective to detect developing bearing faults.

The present invention detects the presence of developing faults in rolling element bearings by measuring the vibration of an apparatus in which bearings are operating and identifying signatures unique to bearing faults.

BRIEF DESCRIPTION OF THE DRAWINGS

FIG. 2(a) illustrates the frequency content from 0 Hz to 2500 Hz of a fault signature model $\{c(n) \ e^{-an}\}*\{(h_{LZ}(n)* P_S(n))P_{CFF}(n)\}$ applied to a set of notional parameters;

FIG. 2(b) illustrates the data shown in FIG. 2(a) from 950 Hz to 1350 Hz;

FIG. 4 is a block diagram showing the process of the present invention.

DETAILED DESCRIPTION OF THE PREFERRED EMBODIMENT

As detailed herein, the present invention detects the presence of developing faults in rolling element bearings. Detection is accomplished by measuring the vibration of the apparatus in which the bearing is operating (motor, generator, engine, etc.) and searching for signatures unique to bearing faults. These signatures are predicted by a fault signature model and recognized by a detector, both of which are part of the present invention.

Figure 1:
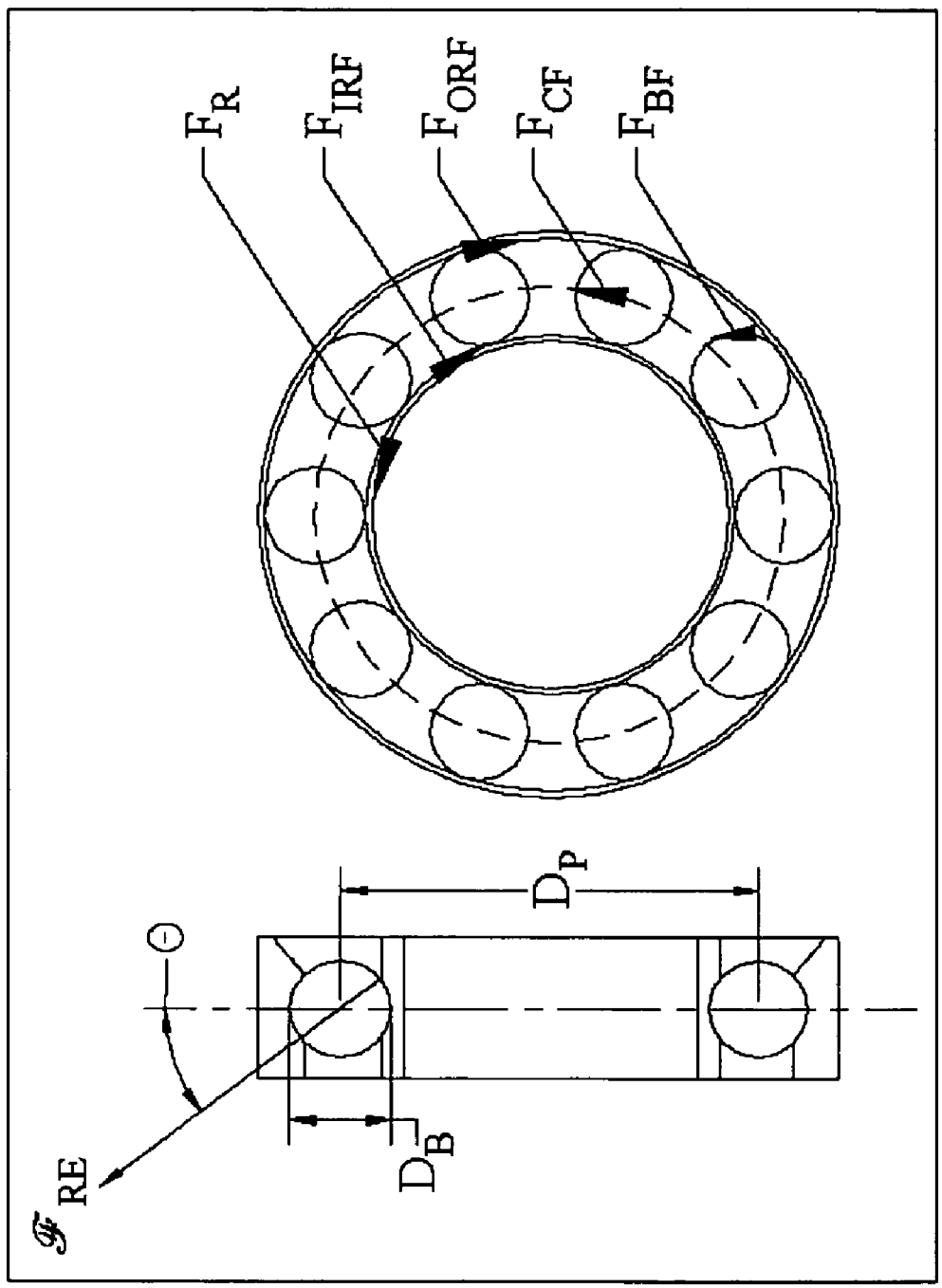
FIG. 1 illustrates a roller bearing showing the bearing surface location of the four characteristic fault frequencies.
Figure 3:
FIG. 3 is an illustration of the fault detector of the present invention.
Figure 3:

Referring to FIG. 1, the present invention begins with the development of a fault signature model for the production and propagation of the signature from a developing bearing fault. This model is given in (5), shown below, and its derivation and explanation is given in J. R. Stack, T. G. Habetler, and R. G. Harley, "Fault signature modeling and detection of inner race bearing faults," *IEEE Int. Conf. Electric Machines and Drives*, San Antonio, Tex., pp. 271-277, May 2005, the disclosure of which is herein incorporated by reference.

$$\{c(n)e^{-an}\} * \{(h_{LZ}(n) * P_S(n))P_{CFF}(n)\} \tag{5}$$

In equation (5), $c(n)$ is colored noise, and $a$ is the time constant for the apparatus's mechanical impulse response. This term, $c(n)e^{-an}$, represents the mechanical impulse response of the electric machine as would be measured by a vibration transducer. $P_S(n)$ and $P_{CFF}(n)$ are periodic pulse trains at the shaft rotation frequency and characteristic fault frequency respectively. The force exerted on the defect area due to the bearing's radial load is modeled by, $h_{LZ}(n)$, which is a constant for outer race defects (as the outer race does not rotate with respect to the load zone) and is predicted by the Stribeck Equation, discussed in T. A. Harris, *Rolling Bearing Analysis*, 4$^{th}$ ed., New York: John Wiley and Sons Inc., 2001. pp. 231-244, for all other defects (inner race, cage fault, or rolling element fault).

Although a fault model was proposed in P. D. McFadden, and J. D. Smith, "Model for the vibration produced by a single point defect in a rolling element bearing," *Journal of Sound and Vibration*, vol. 96, no. 4, pp. 69-82, 1984, the fault signature model in McFadden et al. is lacking in two significant areas. First, the fault signature model proposed in McFadden et al. is founded on a simple (one degree of freedom) model that only models the propagation of energy from the impact at the defect area directly to the transducer. This is insufficient because this energy alone can not be measured or observed. In contrast, the model represented by equation (5) treats the mechanical impulse response of an electric machine as colored noise, $c(n)$. This treatment is deemed appropriate because the purpose is to model the vibration of the entire apparatus (and its significantly coupled masses) as would be measured in practice by a vibration transducer. Second, the order of mathematical operations is different between the model proposed in McFadden et al. and the present invention. This is the result of a different physical interpretation of the process being modeled, and this different mathematical formulation results in a fundamentally different model.

The interpretation of equation (5) is that the mechanical impulse response of an apparatus excited by, or convolved with, a periodic impulse (at the characteristic fault frequency) whose amplitude is periodically modulated (at the shaft rotation frequency) by the influence of the load zone. As seen in FIG. 2(*a*), an illustration of the frequency content of equation (5) is shown being applied to a set of notional parameters. FIG. 2(*b*) represents a segment of the frequencies shown in FIG. 2(*a*), showing the same data in the frequency range of from 950 Hz to 1350 Hz. In the plot shown in FIG. 2(*b*), the peaks have been differentiated by solid lines and dashed lines. As seen by this segregation of the peaks, the composition of the spectrum is shown to constitute adjacent groups of detected noise. The plot of FIG. 2(*a*), as further detailed in FIG. 2(*b*), evidences repetitive patterns within the plot between groups and within the represented groups. In this notional example, $F_S$ is 30 Hz and $F_{CFF}$ is 145 Hz constituting the spectrum of the plot of individual peaks and groups of peaks include spacing of peaks within each group is $F_S$ and the spacing between the groups is $F_{CFF}$. As such, spacing of any given peak within the plot may be mathematically determined as a factor of the peak groups and individual peaks. This spacial relationship for calculating the spacing from any peak in one group to any peak in an adjacent group may be mathematically represented to be:

$$F_{CFF} + m*F_S \tag{6}$$

where $m=0, \pm1, \pm2 \ldots$. In this equation, m is a harmonic number that accounts for the relative positions of two peaks within their respective groups. For example, the spacing in FIG. 2(*b*) between the center peak of one group and the 2nd peak from the left of center in the group immediately to the right is $+F_{CFF}-2*F_S$.

From this observation, an immediate choice for a fault detection scheme is to simply inspect the machine vibration power spectrum for peaks spaced by (6) for various values of m. However, due to the noisy, broadband nature of machine vibration, this approach would result in abundant detections regardless of bearing health. This is because such an approach will detect any and all unrelated frequency components that are coincidentally spaced by (6), and in rich, broadband, noisy data such as machine vibration, these peaks are copious.

However, consider a time series of machine vibration data that contains peaks in its power spectrum separated by (6) (e.g., a peak with two sidebands spaced by $\pm F_{CFF}+m*F_S$ for some arbitrary m), and assume these three peaks originate from unrelated processes and their spacing is entirely coincidental. In this event, while the spacing of these peaks may remain constant, their phases with respect to each other will vary randomly over time (because they are generated by separate, unrelated processes). In contrast, assuming these peaks are generated by the same process (e.g., an inner race bearing defect) provides a different result. In this event, the relative phases between the components will assume some value, but this value will remain constant over time (because the same process simultaneously generates all three components). This principle is known as phase coupling, and it is the foundation of the following fault detection scheme.

A fault detector is proposed in (7) with its normalized form in (8). In these equations, $E\{\ \}$ is the expectation operator and $X\{\ \}$ is the Fourier transform. This detector searches for a peak at frequency f with two phase coupled sideband peaks spaced by $\pm F_{SB}$. The normalized form of this detector in (8) produces peaks that are bounded in magnitude between 0 and 1.0. A peak of magnitude 1.0 signifies all energy at those three frequencies (i.e., f and $F_{SB}$) is generated by the same process, whereas a peak magnitude of less than 1.0 signifies that separate, unrelated processes contribute some of the energy. If all energy at these peaks is contributed by unrelated processes (i.e., no phase coupling is present), the value of (8) will tend toward zero as more segments are averaged together by the expectation operator. Therefore, the result of (8) is a frequency domain plot that exhibits significant energy at every frequency where a peak exists in the machine vibration power spectrum that is flanked by phase coupled sidebands satisfying (6). The development and operation of (7) and (8) follow the authors' previous work in J. R. Stack, R. G. Harley, and T. G. Habetler, "An amplitude modulation detector for fault diagnosis in rolling element bearings," *IEEE Transactions on Industrial Electronics*, vol. 51, no. 5, pp. 1097-1102, October, 2004, the disclosure of which is herein incorporated by reference.

$$D(f)=E\{X(f+F_{SB})X(f-F_{SB})[X^*(f)]^2\} \tag{7}$$

$$d(f) = \frac{|D(f)|^2}{E\{|[X^*(f)]^2|^2\}E\{|X(f+F_{SB})X(f-F_{SB})|^2\}} \quad (8)$$

To apply this detector to actual data, $F_{SB}$ is set to a spacing predicted by (6). A time series of machine vibration is then windowed into segments and the operations inside the expectation operators are applied to each segment. The segments are then averaged together to compute the expectations. After (7) and (8) are computed, a new value of $F_{SB}$ is chosen (i.e., a different value of m) and these two equations are recomputed. For each of the computations of (8), the number of peaks that are above a threshold and spaced by $F_{CFF}$ are counted, and these counts are then used as the fault index. This computation is then performed for various values of m and significant increases in the fault index indicate the development of a bearing fault. The proficiency and performance of this detector (i.e., typical values of fault index counts for healthy and faulty bearings) are verified with experimental results in J. R. Stack, T. G. Habetler, and R. G. Harley, "Fault signature modeling and detection of inner race bearing faults," *IEEE Int. Conf. Electric Machines and Drives*, San Antonio, Tex., pp. 271-277, May 2005.

The present invention is particularly useful in that it searches for phase coupled peaks separated by a spacing predicted by a model rather than simply searching for the existence of the peaks themselves. Additionally, the present invention includes the development of a fault signature model for the production and propagation of bearing fault signatures. This approach is unique in that it is based on a stochastic model (colored noise) of the vibration as it can actually be measured in application.

The present invention detects the presence of developing faults in rolling element bearings by measuring the vibration of the apparatus in which the bearing is operating (motor, generator, engine, etc.) and searching for signatures unique to bearing faults. These signatures are predicted by a fault signature model within the present invention and recognized by the detector. A warning mechanism and/or indicator, relays a warning of the detected developing rolling element bearing fault.

The foregoing summary, description, and examples of the present invention are not intended to be limiting, but are only exemplary of the inventive features which are defined in the claims.

What is claimed is:

1. A fault detector for detecting the presence of faults developing in rolling element bearings within an apparatus, comprising:
    a detector having means for determining a given frequency proportional to rolling element bearing functionality based on a fault signature model, means for measuring vibration of an apparatus in operation containing rolling element bearings and means for determining and indicating when a determined given frequency within a measured vibration is sufficient to detect the presence of developing faults in rolling element bearings within the apparatus; and,
    an indicator for signaling the presence of a developing fault.

2. The device of claim 1, wherein the means for determining and indicating a determined given frequency includes a functionality of:

$D(f)=E\{X(f+F_{SB})X(f-F_{SB})[X^*(f)]^2\}$.

3. The device of claim 1, wherein the apparatus comprises a bearing device includes a rolling element bearing supporting a rotating apparatus.

4. The device of claim 1, wherein the means for determining and indicating a determined given frequency includes a normalization function comprising:

$$d(f) = \frac{|D(f)|^2}{E\{|[X^*(f)]^2|^2\}E\{|X(f+F_{SB})X(f-F_{SB})|^2\}}.$$

5. The device of claim 4, wherein the normalized function ranges from zero to one.

6. A method for monitoring the presence of faults developing in rolling element bearings, comprising the steps of:
    detecting the presence of developing faults by determining a given frequency proportional to rolling element bearing functionality based on a fault signature model measuring vibration of an apparatus in operation containing rolling element bearings and determining and indicating the determined given frequency within the measured vibration is sufficient to detect the presence of developing faults in rolling element bearings within the apparatus; and,
    indicating the presence of a developing fault.

7. The method of claim 6, wherein the fault signature model comprises a plurality of values of m for determining $\pm F_{SB}$.

8. The method of claim 6, wherein the step of determining and indicating the presence of a developing fault within the measured vibration comprises operations for real-time determination of developing rolling element bearing faults.

9. The method of claim 6, further comprising the step of assuming a threshold value for detecting the presence of developing bearing faults.

10. The method of claim 9, wherein the number of frequencies, f, exceeds the value of the determined threshold.

11. The method of claim 6, wherein the fault signature model comprises a pattern recognition of $\pm F_{SB}=F_{CFF}+m^*F_S$ for three or more consecutive values.

12. The method of claim 11, wherein the developed pattern results from a determinative sampling of consecutive values.

13. The method of claim 11, wherein an increasing number of the consecutive values are incorporated into the pattern.

14. The method of claim 13, further comprising the step of invaliding the developed pattern for developed patterns tending to zero with the incorporation of the increasing number of consecutive values.

15. The method of claim 6, wherein the step of determining and indicating the presence of a developing fault comprises the measurement and analysis of vibration for a plurality of time periods.

16. The method of claim 15, wherein the analysis of the measured vibrations includes a calculation of:

$D(f)=E\{X(f+F_{SB})X(f-F_{SB})[X^*(f)]^2\}$.

17. The method of claim 15, wherein the step of determining and indicating the presence of a developing fault comprises normalizing the measured vibration over a plurality of time periods.

18. The method of claim 17, wherein the normalization of the measured vibration of the operating apparatus includes a calculation of:

$$d(f) = \frac{|D(f)|^2}{E\{|[X^*(f)]^2|^2\}E\{|X(f+F_{SB})X(f-F_{SB})|^2\}}.$$

* * * * *